(12) United States Patent
Melanson et al.

(10) Patent No.: US 8,222,872 B1
(45) Date of Patent: Jul. 17, 2012

(54) SWITCHING POWER CONVERTER WITH SELECTABLE MODE AUXILIARY POWER SUPPLY

(75) Inventors: John L. Melanson, Austin, TX (US); Mauro L. Gaetano, Austin, TX (US); Larry L. Harris, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 420 days.

(21) Appl. No.: 12/493,045

(22) Filed: Jun. 26, 2009

Related U.S. Application Data

(63) Continuation-in-part of application No. 12/242,298, filed on Sep. 30, 2008, now Pat. No. 8,008,898.

(60) Provisional application No. 61/145,610, filed on Jan. 19, 2009.

(51) Int. Cl.
*G05F 1/613* (2006.01)
*H02M 7/162* (2006.01)

(52) U.S. Cl. ............. 323/222; 323/282; 363/61; 363/89

(58) Field of Classification Search .................. 323/207, 323/222, 282, 901; 363/21.08, 21.16, 49, 363/60, 61, 89, 84
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,409,476 A | 10/1983 | Lofgren et al. | |
| 4,414,493 A | 11/1983 | Henrich | |

(Continued)

FOREIGN PATENT DOCUMENTS

DE 19713814 10/1998

(Continued)

OTHER PUBLICATIONS

Beaty, H. W., & Fink, D. G. (Eds.). (2007). Standard Handbook for Electrical Engineers (p. 23-42). New York: McGraw-Hill.*

(Continued)

*Primary Examiner* — Adolf Berhane
*Assistant Examiner* — Fred E Finch, III
(74) *Attorney, Agent, or Firm* — Mitch Harris, Atty at Law, LLC; Andrew M. Harris

(57) ABSTRACT

A auxiliary power supply having a selectable operating mode raises efficiency of a switched-power converter. By selectably controlling the input/output behavior of the auxiliary power supply receiving a voltage from an auxiliary winding of one of the power converter magnetic elements, more efficient operation of the auxiliary power supply over the full variation range of the input line voltage is achieved. By selecting the operating mode according to the relationship between the required auxiliary power supply output and the voltage available across the auxiliary winding under current operating conditions, the turns ratio of the auxiliary winding and other circuit parameters can be optimized for efficiency. Selection of the operating mode may be made by detecting the output or input voltage of the multiplier, and the selection may be performed under hysteretic control so that the variation in auxiliary power supply output voltage is reduced dynamically.

22 Claims, 3 Drawing Sheets

U.S. PATENT DOCUMENTS

| | | | |
|---|---|---|---|
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,697,210 A | 9/1987 | Toyota et al. |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A * | 12/1995 | McCambridge et al. ....... 363/49 |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,812,383 A * | 9/1998 | Majid et al. ................ 363/21.05 |
| 5,834,858 A | 11/1998 | Crosman, III et al. |
| 5,874,725 A * | 2/1999 | Yamaguchi ................... 235/492 |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,160,724 A * | 12/2000 | Hemena et al. ................ 363/61 |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Anderson et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 * | 12/2005 | Simada et al. .................. 363/49 |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,136,292 B1 * | 11/2006 | Chan et al. .................. 363/21.09 |
| 7,145,295 B1 | 12/2006 | Lee et al. |
| 7,158,573 B2 | 1/2007 | Hershbarger |
| 7,158,633 B1 | 1/2007 | Hein |
| 7,161,816 B2 | 1/2007 | Shytenberg et al. |
| 7,180,250 B1 | 2/2007 | Gannon |
| 7,183,957 B1 | 2/2007 | Melanson |
| 7,212,640 B2 | 5/2007 | Bizjak |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,272,585 B2 | 9/2007 | Nomura et al. |
| 7,276,861 B1 | 10/2007 | Shteynberg et al. |
| 7,288,902 B1 | 10/2007 | Melanson |
| 7,289,054 B1 | 10/2007 | Watanabe |
| 7,292,013 B1 | 11/2007 | Chen et al. |
| 7,310,244 B2 | 12/2007 | Yang et al. |
| 7,331,226 B2 | 2/2008 | Feldman et al. |
| 7,345,458 B2 | 3/2008 | Kanal et al. |

| | | |
|---|---|---|
| 7,375,476 B2 | 5/2008 | Walter et al. |
| 7,382,635 B2 | 6/2008 | Noda |
| 7,394,210 B2 | 7/2008 | Ashdown |
| 7,468,896 B2 * | 12/2008 | Gong et al. ............... 363/21.17 |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,606,532 B2 * | 10/2009 | Wuidart ...................... 455/41.1 |
| 7,656,103 B2 | 2/2010 | Shteynberg et al. |
| 7,667,986 B2 | 2/2010 | Artusi et al. |
| 7,684,223 B2 * | 3/2010 | Wei .............................. 363/143 |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 8,008,898 B2 * | 8/2011 | Melanson et al. ............ 323/222 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0126368 A1 * | 6/2006 | Rapeanu ......................... 363/89 |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0231009 A1 | 10/2007 | Watahiki |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |

| | | |
|---|---|---|
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0174479 A1 | 7/2009 | Yan et al. |
| 2009/0190379 A1 | 7/2009 | Melanson |
| 2009/0190384 A1 | 7/2009 | Thompson |
| 2009/0191837 A1 | 7/2009 | Nanda et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0632679 | 1/1995 |
| EP | 0838791 | 4/1998 |
| EP | 1014563 | 6/2000 |
| EP | 1164819 | 12/2001 |
| EP | 1213823 | 6/2002 |
| EP | 1460775 | 9/2004 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | WO9725836 | 7/1997 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO2006013557 | 2/2006 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |
| WO | WO2008072160 | 6/2008 |
| WO | WO2008152838 | 12/2008 |

OTHER PUBLICATIONS

Wang, Meizhong. (2005). Understandable Electric Circuits (pp. 171-172). China: Higher Education Press.*

U.S. Appl. No. 12/495,648, filed Jun. 30, 2009, Melanson.

U.S. Appl. No. 12/495,720, filed Jun. 30, 2009, Melanson.

AN-H52 Application Note: "HV9931 Unity Power Factor LED Lamp Driver" Mar. 7, 2007, Supertex Inc., Sunnyvale, CA, USA.

"HV9931 Unity Power Factor LED Lamp Driver, Initial Release", Supertex Inc., Sunnyvale, CA USA 2005.

A. Prodic, Compensator Design and Stability Assessment for Fast Voltage Loops of Power Factor Correction Rectifiers, IEEE Transactions on Power Electronics, vol. 22, No. 5, Sep. 2007.

A. R. Seidel, et al., A Practical Comparison Among High-Power-Factor Electronic Ballasts with Similar Ideas, IEEE Transactions on Industry Applications, vol. 41, No. 6, Nov.-Dec. 2005.

A. Silva De Morais, et al., A High Power Factor Ballast Using a Single Switch with Both Power Stages Integrated, IEEE Transactions on Power Electronics, vol. 21, No. 2, Mar. 2006.

Abramovitz, et al., "A Resonant DC-DC Transformer With Zero Current Ripple", IEEE Transactions on Power Electronics, Nov. 2007, p. 2344-2351, vol. 22, No. 6.

AD7400 Datasheet, "Isolated Sigma-Delta Modulator", Analog Devices 2006.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

Azoteq, IQS17 Family, IQ Switch®—ProxSense™ Series, Touch Sensor, Load Control and User Interface, IQS17 Datasheet V2.00. doc, Jan. 2007.

B.A. Miwa, et al., High Efficiency Power Factor Correction Using Interleaved Techniques, Applied Power Electronics Conference and Exposition, Seventh Annual Conference Proceedings, Feb. 23-27, 1992.

Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.

BB3656 Datasheet "Transformer Coupled Isolation Amplifier", Burr-Brown 1987.

Ben-Yaakov, et al.,"The Dynamics of a PWM Boost Converter with Resistive Input" IEEE Transactions On Industrial Electronics, IEEE Service Center, Piscataway, NJ, USA, vol. 46, No. 3, Jun. 1, 1999.

Bhat, et al., "Analysis and Design of a High-Frequency Resonant Converter Using LCC-Type Commutation", IEEE Transactions on Power Electronics, Oct. 1987, p. 291-301, vol. PE-2 No. 4.

Burr-Brown, "Transformer Coupled Isolation Amplifier", BB3656 Datasheet, Tucson, AZ, 1987.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

C. Dilouie, Introducing the LED Driver, EC&M, Sep. 2004.

C. M. De Oliviera Stein, et al., A ZCT Auxiliary Communication Circuit for Interleaved Boost Converters Operating in Critical Conduction Mode, IEEE Transactions on Power Electronics, vol. 17, No. 6, Nov. 2002.

Chen, et al., "Generalized Optimal Trajectory Control for Closed Loop Control of Series-Parallel Resonant Converter", IEEE Transactions on Power Electronics, Sep. 2006, p. 1347-1355, vol. 21, No. 5.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

Color Temperature, www.sizes.com/units/color_temperature.htm, printed Mar. 27, 2007.

D. Hausman, Lutron, RTISS-TE Operation, Real-Time Illumination Stability Systems for Trailing-Edge (Reverse Phase Control) Dimmers, v. 1.0 Dec. 2004.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

D. Maksimovic, et al., "Switching Converters with Wide DC Conversion Range," Institute of Electrical and Electronic Engineer's (IEEE) Transactions on Power Electronics, Jan. 1991.

D. Rand, et al.,Issues, Models and Solutions for Triac Modulated Phase Dimming of LED Lamps, Power Electronics Specialists Conference, 2007.

D.K.W. Cheng, et al., A New Improved Boost Converter with Ripple Free Input Current Using Coupled Inductors, Power Electronics and Variable Speed Drives, Sep. 21-23, 1998.

Dallas Semiconductor, Maxim, "Charge-Pump and Step-Up DC-DC Converter Solutions for Powering White LEDs in Series or Parallel Connections," Apr. 23, 2002.

Data Sheet LT3496 Triple Output LED Driver, Linear Technology Corporation, Milpitas, CA 2007.

De Groot, et al., "Design of a 1-MHz LCC Resonant Converter Based on a DSP-Driven SOI Half-Bridge Power MOS Module", IEEE Transactions on Power Electronics, Nov. 2007, p. 2307-2320, vol. 22 No. 4.

Doyle, et al.,Feedback Control Theory, Macmillan Publishing Co., 1990.

Dunn, Jamie, "Determining MOSFET Driver Needs for Motor Drive Applications," AN898 Application Note, Microchip Technology, Chandler, AZ, 2003.

Dustin Rand, et al., "Issues, Models and Solutions for Triac Modulated Phase Dimming of LED Lamps" Power Electronics Specialists Conference, 2007. PESC 2007. IEEE, IEEE, p. 1, Jun. 1, 2007, pp. 1398-1404.

Erickson, Robert W. , et al.,"Fundamentals of Power Electronics," Second Edition, Chapter 6, Boulder, CO, 2001.

F. T. Wakabayashi, et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

F. Tao, et al., "Single-Stage Power-Factor-Correction Electronic Ballast with a Wide Continuous Dimming Control for Fluorescent Lamps," IEEE Power Electronics Specialists Conference, vol. 2, 2001.

Fairchild Semiconductor, Application Note 42030, Theory and Application of the ML4821 Average Current Mode PFC Controller, Oct. 25, 2000.

Fairchild Semiconductor, Application Note 42030, Theory and Application of the ML4821 Average Current Mode PFC Controller, Aug. 1997.

Fairchild Semiconductor, Application Note 42047 Power Factor Correction (PFC) Basics, Rev. 0.9.0 Aug. 19, 2004.

Fairchild Semiconductor, Application Note 6004, 500W Power-Factor-Corrected (PFC) Converter Design with FAN4810, Rev. 1.0.1, Oct. 31, 2003.

Fairchild Semiconductor, Application Note AN4121, Design of Power Factor Correction Circuit Using FAN7527B, Rev.1.0.1, May 30, 2002.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVA Average Current PFC Controller, Rev. 1.0.1 Aug. 10, 2001.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, FAN7532, Ballast Controller, Rev. 1.0.2, Jun. 2006.

Fairchild Semiconductor, FAN7544, Simple Ballast Controller, Rev. 1.0.0, 2004.

Fairchild Semiconductor, FAN7711, Ballast Control IC, Rev. 1.0.2, Mar. 2007.

Fairchild Semiconductor, KA7541, Simple Ballast Controller, Rev. 1.0.3, 2001.

Fairchild Semiconductor, ML4812, Power Factor Controller, Rev. 1.0.4, May 31, 2001.

Fairchild Semiconductor, ML4821, Power Factor Controller, Jun. 19, 2001.

Fairchild Semiconductor, ML4821, Power Factor Controller, Rev. 1.0.2, Jun. 19, 2001.

Feng, et al. "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.

Foster, et al., "Cyclic-Averaging for High Speed Analysis of Resonant Converters", IEEE Transactions on Power Electronics, Jul. 2003, p. 985-993, vol. 18, No. 4.

Freescale Semiconductor, AN1965, Design of Indirect Power Factor Correction Using 56F800/E, Jul. 2005.

Freescale Semiconductor, AN3052, Implementing PFC Average Current Mode Control Using the MC9S12E128, Nov. 2005.

Freescale Semiconductor, Inc., Dimmable Light Ballast with Power Factor Correction, Design Reference Manual, DRM067, Rev. 1, Dec. 2005.

G. Yao, et al., Soft Switching Circuit for Interleaved Boost Converters, IEEE Transactions on Power Electronics, vol. 22, No. 1, Jan. 2007.

Gu, et al, "Three-Level LLC Series Resonant DC/DC Converter," IEEE Transactions on Power Electronics, vol. 20, No. 4, p. 781-789, Jul. 2005.

H. L. Cheng, et al., A Novel Single-Stage High-Power-Factor Electronic Ballast with Symmetrical Topology, IEEE Transactions on Power Electronics, vol. 50, No. 4, Aug. 2003.

H. Peng, et al., Modeling of Quantization Effects in Digitally Controlled DC-DC Converters, IEEE Transactions on Power Electronics, vol. 22, No. 1, Jan. 2007.

H. Wu, et al., Single Phase Three-Level Power Factor Correction Circuit with Passive Lossless Snubber, IEEE Transactions on Power Electronics, vol. 17, No. 2, Mar. 2006.

Hattrup, et al., "Fast Estimation Techniques for Digital Control of Resonant Converters", IEEE Transactions on Power Electronics, Jan. 2003, p. 365-372, vol. 18, No. 1.

Hirota, Atsushi, et al., "Analysis of Single Switch Delta-Sigma Modulated Pulse Space Modulation PFC Converter Effectively Using Switching Power Device," IEEE, US, 2002.

Infineon, CCM-PFC Standalone Power Factor Correction (PFC) Controller in Continuous Conduction Mode (CCM), Version 2.1, Feb. 6, 2007.

International Rectifier, Application Note AN-1077, PFC Converter Design with IR1150 One Cycle Control IC, rev. 2.3, Jun. 2005.

International Rectifier, Data Sheet No. PD60230 revC, IR1150(S)(PbF), uPFC One Cycle Control PFC IC Feb. 5, 2007.

International Rectifier, Data Sheet PD60230 revC, Feb. 5, 2007.

International Rectifier, IRAC1150-300W Demo Board, User's Guide, Rev 3.0, Aug. 2, 2005.

Intersil, "Designing with the ISL6752, ISL6753 ZVS Full-Bridge Controllers," Application Note AN1262.0, Aug. 15, 2006.

Intersil, AN1262.0, "Designing with the ISL6752, ISL6753 ZVS Full-Bridge Controllers", Aug. 2006.

J. A. Vilela Jr., et al., An Electronic Ballast with High Power Factor and Low Voltage Stress, IEEE Transactions on Industry Applications, vol. 41, No. 4, Jul./Aug. 2005.

J. Qian, et al., Charge Pump Power-Factor-Correction Technologies Part II: Ballast Applications, IEEE Transactions on Power Electronics, vol. 15, No. 1, Jan. 2000.

J. Qian, et al., New Charge Pump Power-Factor-Correction Electronic Ballast with a Wide Range of Line Input Voltage, IEEE Transactions on Power Electronics, vol. 14, No. 1, Jan. 1999.

J. Turchi, Four Key Steps to Design a Continuous Conduction Mode PFC Stage Using the NCP1653, on Semiconductor, Publication Order No. AND184/D, Nov. 2004.

J. Zhou, et al., Novel Sampling Algorithm for DSP Controlled 2 kW PFC Converter, IEEE Transactions on Power Electronics, vol. 16, No. 2, Mar. 2001.

J.W.F. Dorleijn, et al., Standardisation of the Static Resistances of Fluorescent Lamp Cathodes and New Data for Preheating, Industry Applications Conference, vol. 1, Oct. 13, 2002-Oct. 18, 2002.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

K. Leung, et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K.M. Smedley, One-Cycle Control of Switching Converters, IEEE Transactions on Power Electronics, vol. 10, No. 6, Nov. 1995.

L. Balogh, et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

L. Gonthier, et al., EN55015 Compliant 500W Dimmer with Low-Losses Symmetrical Switches, 2005 European Conference on Power Electronics and Applications, Sep. 2005.

Laouamri, et al., "Modeling and Analysis of Wound Integrated LCT Structure for Single Stage Resonant PFC Rectifier", IEEE Transactions on Power Electronics, Jan. 2003, p. 256-269, vol. 18, No. 1.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Lilei Gu, et al., "Three-Level LLC Series Resonant DC/DC Converter", IEEE Transactions on Power Electronics, Jul. 2005, p. 781-789, vol. 20, No. 4.

Lin, et al., "Robust Controller Design for a Series Resonant Converter via Duty-Cycle Control", IEEE Transactions on Power Electronics, Sep. 1999, p. 793-802, vol. 14 No. 5.

Linear Technology, "Single Switch PWM Controller with Auxiliary Boost Converter," LT1950 Datasheet, Linear Technology, Inc., Milpitas, CA, 2003.

Linear Technology, LTC3705 Datasheet, 2005 Linear Technology, Inc.

Linear Technology, 100 Watt LED Driver, Linear Technology, 2006.

Linear Technology, LT1248, Power Factor Controller, Apr. 20, 2007.

Linear Technology, News Release, Triple Output LED, LT3496, Linear Technology, Milpitas, CA, May 24, 2007.

Linear Technology, "2-Switch Forward Controller and Gate Driver," LTC3705 Datasheet, Linear Technology, Inc., Milpitas, CA, 2005.

Lu, et al., International Rectifier, Bridgeless PFC Implementation Using One Cycle Control Technique, 2005.

Lu, et al., "Quasi Current Mode Control for the Phase-Shifted Series Resonant Converter," IEEE Transactions on Power Electronics, vol. 23, No. 1, p. 353-358, Jan. 2008.

M. Brkovic, et al., "Automatic Current Shaper with Fast Output Regulation and Soft-Switching," S.15.C Power Converters, Telecommunications Energy Conference, 1993.

M. K. Kazimierczuk, et al., Electronic Ballast for Fluorescent Lamps, IEEE Transactions on Power Electronics, vol. 8, No. 4, Oct. 1993.

M. Madigan, et al., Integrated High-Quality Rectifier-Regulators, IEEE Transactions on Industrial Electronics, vol. 46, No. 4, Aug. 1999.

M. Ponce, et al., High-Efficient Integrated Electronic Ballast for Compact Fluorescent Lamps, IEEE Transactions on Power Electronics, vol. 21, No. 2, Mar. 2006.

M. Radecker, et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades, et al., Low Cost Electronic Ballast for a 36-W Fluorescent Lamp Based on a Current-Mode-Controlled Boost Inverter for a 120-V DC Power Distribution, IEEE Transactions on Power Electronics, vol. 21, No. 4, Jul. 2006.

Mammano, B., Resonant Mode Converter Topologies, Texas Instruments, 2001.

Mangat, et al., "A Modified Asymmetrical Pulse-Width-Modulated Resonant DC/DC Converter Topology", IEEE Transactions on Power Electronics, Jan. 2004, p. 104-111, vol. 19, No. 1.

Megaman, D or S Dimming ESL, Product News, Mar. 15, 2007.

National Lighting Product Information Program, Specifier Reports, "Dimming Electronic Ballasts," vol. 7, No. 3, Oct. 1999.

Noon, Jim, "UC3855A/B High Performance Power Factor Preregulator", Texas Instruments, SLUA146A, May 1996, Revised Apr. 2004.

NXP, TEA1750, GreenChip III SMPS control IC Product Data Sheet, Apr. 6, 2007.

O. Garcia, et al., High Efficiency PFC Converter to Meet EN61000-3-2 AND A14, Proceedings of the 2002 IEEE International Symposium on Industrial Electronics, vol. 3, 2002.

On Semconductor, NCP1606, Cost Effective Power Factor Controller, Mar. 2007.

On Semiconductor, AND8123/D, Power Factor Correction Stages Operating in Critical Conduction Mode, Sep. 2003.

On Semiconductor, MC33260, GreenLine Compact Power Factor Controller: Innovative Circuit for Cost Effective Solutions, Sep. 2005.

On Semiconductor, NCP1605, Enhanced, High Voltage and Efficient Standby Mode, Power Factor Controller, Feb. 2007.

On Semiconductor, NCP1654, Product Review, Power Factor Controller for Compact and Robust, Continuous Conduction Mode Pre-Converters, Mar. 2007.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

P. Lee, et al., Steady-State Analysis of an Interleaved Boost Converter with Coupled Inductors, IEEE Transactions on Industrial Electronics, vol. 47, No. 4, Aug. 2000.

Philips, Application Note, 90W Resonant SMPS with TEA1610 SwingChip, AN99011, 1999.

Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11, 2008.

Prodic, A. et al, "Dead Zone Digital Controller for Improved Dynamic Response of Power Factor Preregulators," IEEE, 2003.

Prodic, Aleksandar, "Digital Controller for High-Frequency Rectifiers with Power Factor Correction Suitable for On-Chip Implementation," IEEE, US, 2007.

Q. Li, et al., An Analysis of the ZVS Two-Inductor Boost Converter under Variable Frequency Operation, IEEE Transactions on Power Electronics, vol. 22, No. 1, Jan. 2007.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

Renesas, HA16174P/FP, Power Factor Correction Controller IC, Jan. 6, 2006.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

S. Chan, et al., Design and Implementation of Dimmable Electronic Ballast Based on Integrated Inductor, IEEE Transactions on Power Electronics, vol. 22, No. 1, Jan. 2007.

S. Dunlap, et al., Design of Delta-Sigma Modulated Switching Power Supply, Circuits & Systems, Proceedings of the 1998 IEEE International Symposium, 1998.

S. Lee, et al., A Novel Electrode Power Profiler for Dimmable Ballasts Using DC Link Voltage and Switching Frequency Controls, IEEE Transactions on Power Electronics, vol. 19, No. 3, May 2004.

S. Lee, et al., Triac Dimmable Ballast with Power Equalization, IEEE Transactions on Power Electronics, vol. 20, No. 6, Nov. 2005.

S. Skogstad, et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

S. T.S. Lee, et al., Use of Saturable Inductor to Improve the Dimming Characteristics of Frequency-Controlled Dimmable Electronic Ballasts, IEEE Transactions on Power Electronics, vol. 19, No. 6, Nov. 2004.

S. Zhou, et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

Spiazzi G., et al: "Analysis of a High-Power Factor Electronic Ballast for High Brightness Light Emitting Diodes" Power Electronics Specialists, 2005 IEEE 36TH Conference on June 12, 2005, Piscatawa, NJ, USA, IEEE, Jun. 12, 2005, pp. 1494-1499.

ST Microelectronics, AN993, Application Note, Electronic Ballast with PFC Using L6574 and L6561, May 2004.

ST Microelectronics, L6574, CFL/TL Ballast Driver Preheat and Dimming, Sep. 2003.

ST Microelectronics, Power Factor Corrector L6561, Jun. 2004.

ST Microelectronics, L6563, Advanced Transition-Mode PFC Controller, Mar. 2007.

Supertex Inc., 56W Off-line LED Driver, 120VAC with PFC, 160V, 350mA Load, Dimmer Switch Compatible, DN-H05, Feb. 2007.

Supertex Inc., Buck-based LED Drivers Using the HV9910B, Application Note AN-H48, Dec. 28, 2007.

Supertex Inc., HV9931 Unity Power Factor LED Lamp Driver, Application Note AN-H52, Mar. 7, 2007.

T. Wu, et al., Single-Stage Electronic Ballast with Dimming Feature and Unity Power Factor, IEEE Transactions on Power Electronics, vol. 13, No. 3, May 1998.

Texas Instruments BiCMOS Advanced Phase-Shift PWM Controller Datasheet, Dec. 1999, Rev. Apr. 2008.

Texas Instruments, "BiCMOS Advanced Phase-Shift PWM Controller Datasheet," UCC1895, UCC2895, UCC3895, Dec. 1999, Rev. Apr. 2008.

Texas Instruments, Application Note SLUA321, Startup Current Transient of the Leading Edge Triggered PFC Controllers, Jul. 2004.

Texas Instruments, Application Report SLUA308, UCC3817 Current Sense Transformer Evaluation, Feb. 2004.

Texas Instruments, Application Report SLUA369B, 350-W, Two-Phase Interleaved PFC Pre-Regulator Design Review, Mar. 2007.

Texas Instruments, Application Report SPRA902A, Average Current Mode Controlled Power Factor Correctiom Converter using TMS320LF2407A, Jul. 2005.

Texas Instruments, Application Report, SLUA309A, Avoiding Audible Noise at Light Loads when using Leading Edge Triggered PFC Converters, Sep. 2004.

Texas Instruments, SLOS318F, "High-Speed, Low Noise, Fully-Differential I/O Amplifiers," THS4130 and THS4131, US, Jan. 2006.

Texas Instruments, SLUS828B, "8-Pin Continuous Conduction Mode (CCM) PFC Controller", UCC28019A, US, revised Apr. 2009.

Texas Instruments, Transition Mode PFC Controller, SLUS515D, Jul. 2005.

Texas Instruments, UCC3817 BiCMOS Power Factor Preregulator Evaluation Board Users Guide, Nov. 2002.

Tuomainen, et al., "Effect of Resonant Transition on Efficiency of Forward Converter with Active Clamp and Self-Driven SRs", IEEE Transactions on Power Electronics, Mar. 2005, p. 315-323, vol. 20, No. 2.

Unitrode Products From Texas Instruments, BiCMOS Power Factor Preregulator, Feb. 2006.

Unitrode Products From Texas Instruments, High Performance Power Factor Preregulator, Oct. 2005.

Unitrode Products From Texas Instruments, Programmable Output Power Factor Preregulator, Dec. 2004.

Unitrode, Design Note DN-39E, Optimizing Performance in UC3854 Power Factor Correction Applications, Nov. 1994.

Unitrode, High Power-Factor Preregulator, Oct. 1994.

Unitrode, L. Balogh, Design Note UC3854A/B and UC3855A/B Provide Power Limiting with Sinusoidal Input Current for PFC Front Ends, SLUA196A, Nov. 2001.

V. Nguyen, et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

Vishwanathan, et al., "High Voltage DC Power Supply Topology for Pulsed Load Applications with Converter Switching Synchronized to Load Pulses," Power Electronics Group, Bangalore, India, Nov. 2003, vol. 1.

W. Zhang, et al., A New Duty Cycle Control Strategy for Power Factor Correction and FPGA Implementation, IEEE Transactions on Power Electronics, vol. 21, No. 6, Nov. 2006.

Why Different Dimming Ranges? The Difference Between Measured and Perceived Light, 2000 http://www.lutron.com/ballast/pdf/LutronBallastpg3.pdf.

Wong, et al.,"Steady-state Analysis of Hysteretic Control Buck Converters", Power Electronics and Motion Control Conference, IEEE Press, New Jersey, Sep. 2008.

Xie, et al., "Analysis and Optimization of LLC Resonant Converter With a Novel Over-Current Protection Circuit", IEEE Transactions on Power Electronics, Mar. 2007, p. 435-443, vol. 22 No. 2.

Y. Ji, et al., Compatibility Testing of Fluorescent Lamp and Ballast Systems, IEEE Transactions on Industry Applications, vol. 35, No. 6, Nov./Dec. 1999.

Y. Ohno, Spectral Design Considerations for White LED Color Rendering, Final Manuscript, Optical Engineering, vol. 44, 111302 (2005).

Yan Lu, et al., "Quasi Current Mode Control for the Phase-Shifting Series Resonant Converter", IEEE Transactions on Power Electronics, Jan. 2008, p. 353-358, vol. 23 No. 1.

Ye, et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.

Z. Lai, et al., A Family of Power-Factor-Correction Controllers, Twelfth Annual Applied Power Electronics Conference and Exposition, vol. 1, Feb. 23, 1997-Feb. 27, 1997.

Zhao, et al., "Steady-state and Dynamic Analysis of a Buck Converter Using a Hysteretic PWM Control", Power Electronics Specialists Conference, IEEE Press, New Jersey, Jun. 2004.

http://toolbarpdf.com/docs/functions-and-features-of-inverters.html printed on Jan. 20, 2011.

Mamano, Bob, "Current Sensing Solutions for Power Supply Designers", Unitrode Seminar Notes SEM1200, 1999.

Texas Instruments, Interleaving Continuous Conduction Mode PFC Controller, UCC28070, SLUS794C, Nov. 2007, revised Jun. 2009, Texas Instruments, Dallas TX.

Maksimovic, et al., "Impact of Digital Control in Power Electronics", Proceedings of the 2004 International Symposium on Power Semiconductor Devices & ICs, pp. 13-22, Kitakyushu, JP, 2004.

L6562 Datasheet, "Transition-Mode PFC Controller", ST Microelectronics, Nov. 2005, Geneva, Switzerland.

* cited by examiner

SWITCHING POWER CONVERTER WITH SELECTABLE MODE AUXILIARY POWER SUPPLY

The present application is a Continuation-in-Part of U.S. patent application Ser. No. 12/242,298, filed on Sep. 30, 2008 now U.S. Pat. No. 8,008,898, and entitled "SWITCHING REGULATOR WITH BOOSTED AUXILIARY WINDING SUPPLY." The present application also Claims priority under 35 U.S.C. §119(e) to U.S. Provisional Patent Application Ser. No. 61/145,610 filed on Jan. 19, 2009.

BACKGROUND OF THE INVENTION

1. Field of the Invention

The present invention relates generally to switching power converter circuits, and more specifically, to a switching power converter in which an auxiliary winding power supply includes a selectable mode to stabilize the voltage provided from the auxiliary winding.

2. Background of the Invention

In order to supply power to control circuits of a line-powered switching power converter, a low voltage power supply is needed, typically between 3V and 12V at a few milliamperes of current. However, until the power converter is operating, the only power source typically available is the Alternating Current (AC) power line. The high voltage of the AC power line makes it impractical to use resistors to drop the voltage to the required voltage for the controller, as the power dissipation in the resistor will typically be on the order of several Watts.

Therefore, an auxiliary winding provided on one of the converter magnetics is frequently used to supply power to the converter controller integrated circuit (IC), since a lower voltage can be generated directly through the use of the auxiliary winding, therefore reducing wasted power. However, such an auxiliary power supply still has an output voltage that varies with the magnitude of the rectified AC power line at the input of the switching power converter, which can vary as much as 3:1 for a typical Universal Input power supply, and when start-up and transient hold-over conditions are taken into account, the input voltage variation is even greater. In order to ensure that there is sufficient voltage available to operate the controller IC under all input line conditions, the maximum auxiliary power supply output voltage will typically be at least three times the minimum required output voltage. Therefore, the IC must either be designed to handle the full range of power supply voltages that may be provided from the auxiliary winding or the voltage must be regulated, e.g., with a Zener diode circuit, wasting power, dissipating heat, and typically reducing reliability.

Therefore, it would be desirable to provide an auxiliary power supply circuit and method that provide operating voltage for a controller IC over a wide range of input line conditions, without an output voltage that varies over the full range of auxiliary winding output voltage, or that requires lossy regulation of the auxiliary winding output voltage.

SUMMARY OF THE INVENTION

The above stated objective of providing an auxiliary power supply circuit and method that operate over a wide range of input line conditions without requiring that the controller IC supplied by the auxiliary power supply circuit operate over the auxiliary winding variation range, and without requiring lossy voltage drops to lower the voltage provided to the controller IC, is provided in a switching converter and a method of operation of the switching converter.

The switching converter has a magnetic coupling element including at least a primary and at least one auxiliary winding. The auxiliary winding is provided to an auxiliary power supply circuit having a selectable operating mode. In a first operating mode, the auxiliary power supply provides a higher output voltage for the same available auxiliary winding voltage than in the second operating mode. The operating mode may be made by selection of a configurable rectifier circuit, by a selection among multiple auxiliary windings having differing turns ratios, or by another technique that raises the voltage in the first operating mode.

The selection of the auxiliary power supply operating mode may be made in response to measuring the output voltage of the auxiliary power supply, and may be performed dynamically, providing a hysteretic controller that further improves the efficiency of the auxiliary power supply. The selection may alternatively be made by measuring the voltage across the auxiliary winding, or by some other indication of the magnitude of the voltage applied to the input of the switching power converter, which may be a line input or an intermediate node in a cascaded power converter.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses auxiliary power supply circuits and methods for providing power to control and/or other circuits internal to a switching power converter. An auxiliary power supply having a selectable operating mode changes its behavior to compensate for changes in the voltage available from an auxiliary winding provided on a magnetic coupling element of the switching power converter. The selectable operating mode provides for efficient operation over a wider range of variation of a supply voltage at the input of the switching power converter than would be possible without selectable operation. By providing a selectable relationship between the voltage available across the auxiliary winding and the output voltage of the auxiliary power supply, the auxiliary power supply can operate more efficiently under different input voltage conditions. The turns ratio of the auxiliary winding, as well as other circuit parameters can be more readily optimized in a design, given the greater degree of control over the output voltage of the auxiliary power supply afforded by the present invention.

Figure 1:
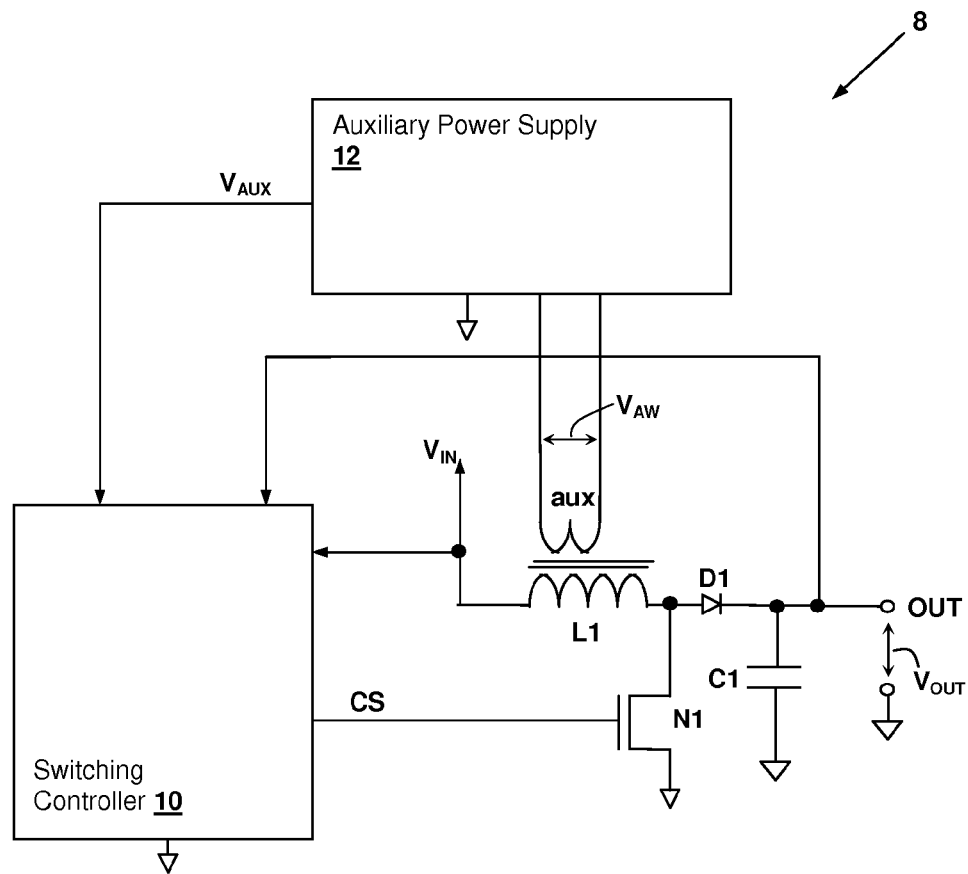
FIG. 1 is a block diagram depicting a switching converter in accordance with an embodiment of the present invention.

Referring now to FIG. 1, a switching power converter 8, in accordance with an embodiment of the present invention is shown. A switching controller 10 provides a switching control signal CS that controls a switching circuit implemented by a transistor N1. When transistor N1 is active, a magnetic coupling element supplied by inductor L1 is charged by imposing input voltage $V_{IN}$ across inductor L1, causing a current through inductor L1 to linearly increase. When transistor N1 is deactivated, charge is pushed through inductor L1 and diode D1 into capacitor C1, raising the voltage at output terminal OUT. Switching power converter 8 forms a boost converter circuit that can control the voltage provided to output terminal OUT according to a feedback value generated from an output voltage $V_{OUT}$ provided by switching power converter 8 from terminal OUT. Alternatively, current mode feedback may be employed in certain applications. An auxiliary power supply 12 supplies a voltage $V_{AUX}$ to controller 10, and is generally integrated in the same integrated circuit (IC) with controller 10. The inputs of auxiliary power supply 12 are connected to an auxiliary winding aux of inductor L1, and receive a voltage $V_{AW}$ from auxiliary winding aux.

Figure 2A:
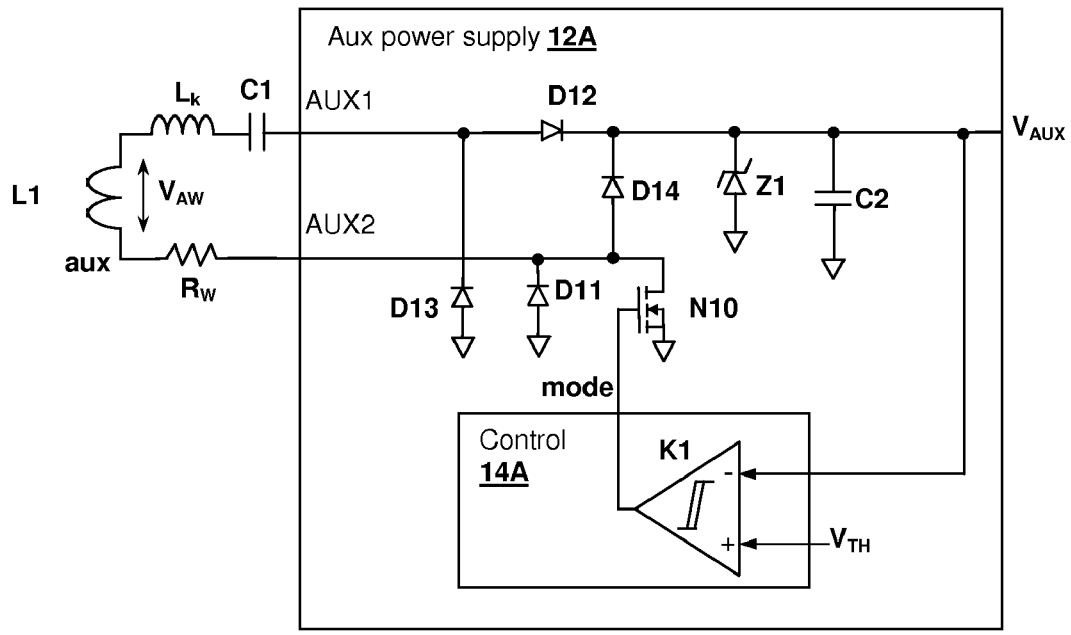
FIG. 2A is a schematic diagram depicting details of an auxiliary power supply 12A that can be used to implement auxiliary power supply 12 of FIG. 1 in accordance with an embodiment of the present invention.

Referring now to FIG. 2A, an auxiliary power supply circuit 12A that may be used to implement auxiliary power supply 12 of FIG. 1 is shown in accordance with an embodiment of the invention. The input of auxiliary power supply 12A is connected to the auxiliary winding of inductor L1, with inductance $L_k$ and resistance $R_W$ representing the respective parasitic leakage inductance and wire resistance of the auxiliary winding aux. A capacitor C1 AC-couples auxiliary winding aux to the inputs of auxiliary power supply 12A, so that in a first operating mode, selected by activating transistor N10, diodes D11 and D14 are effectively removed, since diode D14 will remain reverse-biased and diode D11 is shorted. In the first operating mode, auxiliary power supply circuit 12A operates as a voltage doubler circuit. A Zener diode Z1 is provided to ensure that output voltage $V_{AUX}$ does not exceed a maximum level, but Zener diode Z1 is not normally activated in any operating mode of auxiliary power supply circuit 12A, unlike some other auxiliary power supply circuits that regulate using a Zener diode and thereby introduce additional heat and inefficiency in the power converter.

In the first operating mode (e.g., voltage doubler mode) of auxiliary power supply 12A, during a negative phase of voltage $V_{AW}$ across auxiliary winding aux, diode D13 conducts and capacitor C1 charges to the negative peak of the voltage available across auxiliary winding aux, less the voltage drop of diode D13, during this phase, diode D12 is reverse-biased. During the next positive phase of the voltage available across auxiliary winding aux, diode D13 is reverse-biased and diode D12 conducts. The voltage across auxiliary winding aux during the positive phase is added to the voltage that was placed on capacitor C1 during the previous negative phase, resulting in a voltage addition. The voltage doubler circuit implemented by auxiliary power supply 12A in the first operating mode is referred to as a voltage doubler by convention. The convention arises due to the use of such circuits when the positive and negative phase peaks of the AC input are equal. However, in applications such as the boost converter of FIG. 1, the positive and negative phase peaks are not equal, and the inequality presents a problem with respect to auxiliary power supply generation that is solved by the use of the voltage doubler operating mode of auxiliary power supply 12A.

In the boost converter of FIG. 1, voltage $V_{AW}$ across auxiliary winding aux is generated by division of the voltage across inductor L1 multiplied by turns ratio n1/n2, where n1 is the number of turns in the primary winding of inductor L1 and n2 is the number of turns in auxiliary winding aux. During the first switching phase in which inductor L1 is being charged from the input voltage $V_{IN}$, i.e., the phase in which switching transistor N1 is activated, the open-circuit available voltage across auxiliary winding aux is given by voltage $V_{IN}*n1/n2$, where input voltage $V_{IN}$ is generally a rectified AC power line source. During the second switching phase when transistor N1 is turned off, the peak voltage available voltage across auxiliary winding aux is given by voltage $(V_{OUT}-V_{IN})*n1/n2$. In universal power supply applications, voltage $V_{IN}$ may vary as much as 3:1 as mentioned above. Because the voltage doubler operating mode is in reality a voltage adder, the result of adding the peaks during the negative and positive phases of the switching period yields an auxiliary power supply output voltage of:

$$V_{AUX} \approx (V_{OUT}-V_{IN})*n1/n2 + V_{IN}*n1/n2 = V_{OUT}*n1/n2.$$

The voltage doubler operating mode is a very desirable mode of operation in that output voltage $V_{OUT}$ is generally enforced to be the same value, irrespective of the value of input voltage $V_{IN}$. Therefore in the first operating mode (doubler operating mode), auxiliary power supply 12A provides a substantially constant output voltage.

In a second mode of operation of auxiliary power supply 12A, transistor N10 is de-activated, and diodes D11-D14 act as a full-wave bridge rectifier that rectifies the AC-coupled voltage $V_{AW}$ available across auxiliary winding aux as coupled through capacitor C1. Since auxiliary winding aux is AC-coupled, the DC potential between the inputs of the bridge rectifier formed by diodes D11-D14 can be non-zero and will assume the difference between the positive and negative peaks of voltage $V_{AW}$. The resulting DC potential appears across capacitor C1. Therefore, the positive and negative peak voltages provided by the outputs of the bridge rectifier formed by diodes D11-D14, which provides output OUT of auxiliary power supply 12A in the second operating mode is:

$$V_{AUX} \approx n1/n2(V_{OUT}-V_{OUT}/2)=V_{OUT}/2*n1/n2.$$

Resulting voltage $V_{AUX}$ in the second operating mode, is exactly one-half of the voltage produced in the first operating mode. Therefore, the ratio of output voltage $V_{AUX}$ to voltage $V_{AW}$ available from auxiliary winding aux is different for each of the operating modes. In the depicted embodiment, since auxiliary power supply 12A employs selectable voltage doubling, the ratios are 2:1 and 1:1, but depending on the particular auxiliary power supply circuit employed to provide differing output voltages $V_{AUX}$, different ratios, as well as non-integer ratios may be provided in accordance with other embodiments of the present invention. The second operating mode is referred to herein as an averaging operating mode, as the second operating mode provides the above-described voltage averaging action as opposed to the voltage doubling action of the first operating mode.

Figure 3:
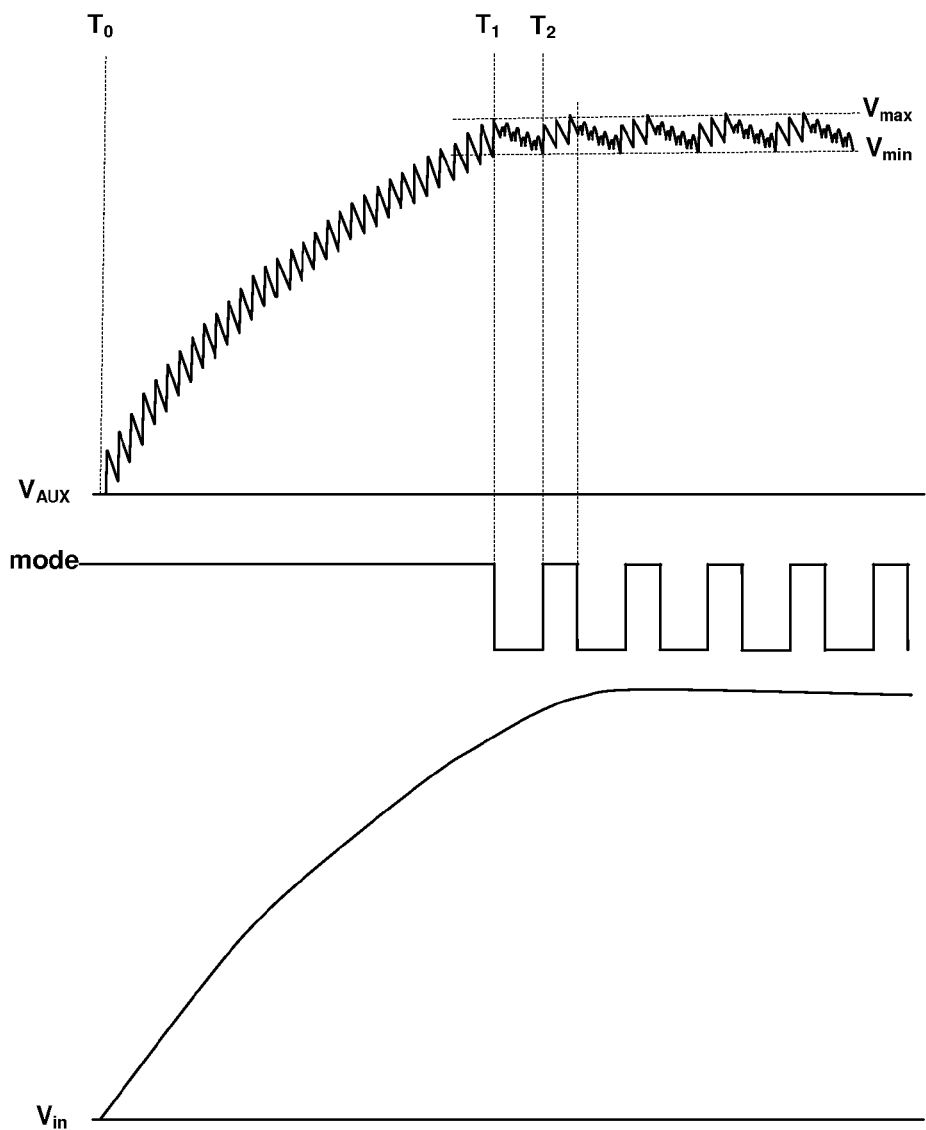
FIG. 3 is a signal waveform diagram depicting details of operation of the switching converter of FIG. 1 in accordance with an embodiment of the invention.

The two operating modes can be used in conjunction to form a voltage regulator, in which the selectable operating mode is controlled in conformity with a magnitude of auxiliary power supply output voltage $V_{AUX}$. Auxiliary power supply 12A of FIG. 2A illustrates such a regulator. A hysteresis comparator K1 within control circuit 14A controls the gate of transistor N10 by comparing auxiliary power supply output voltage $V_{AUX}$ with a threshold voltage $V_{TH}$ which can be generally set to any voltage between the auxiliary power supply output voltage $V_{AUX}$ of the first operating mode and the second operating mode. The resulting operation regulates auxiliary power supply output voltage $V_{AUX}$ to a desired level. Referring now to FIG. 3, operation of auxiliary power supply 12A in hysteretic regulation is shown at startup. Signal mode indicates the state of the gate of transistor N10. Between time $T_0$ and time $T_1$, auxiliary power supply 12A remains in the first (doubler) operating mode. Auxiliary power supply output voltage $V_{AUX}$ increases as input voltage $V_{in}$ increases, and the power converter of FIG. 1 begins operation. At time $T_1$, output voltage $V_{AUX}$ reaches threshold voltage $V_{TH}$ plus the hysteresis of comparator K1, which is maximum voltage $V_{max}$ and the output of hysteresis comparator K1 changes to select the second (averaging) operating mode. Output voltage $V_{AUX}$ decreases until it reaches threshold voltage $V_{TH}$ minus the hysteresis of comparator K1, which is shown as minimum voltage $V_{min}$. When output voltage $V_{AUX}$ reaches minimum voltage $V_{min}$, the output of hysteresis comparator K1 changes to again select the first (doubling) operating mode.

Figure 2B:
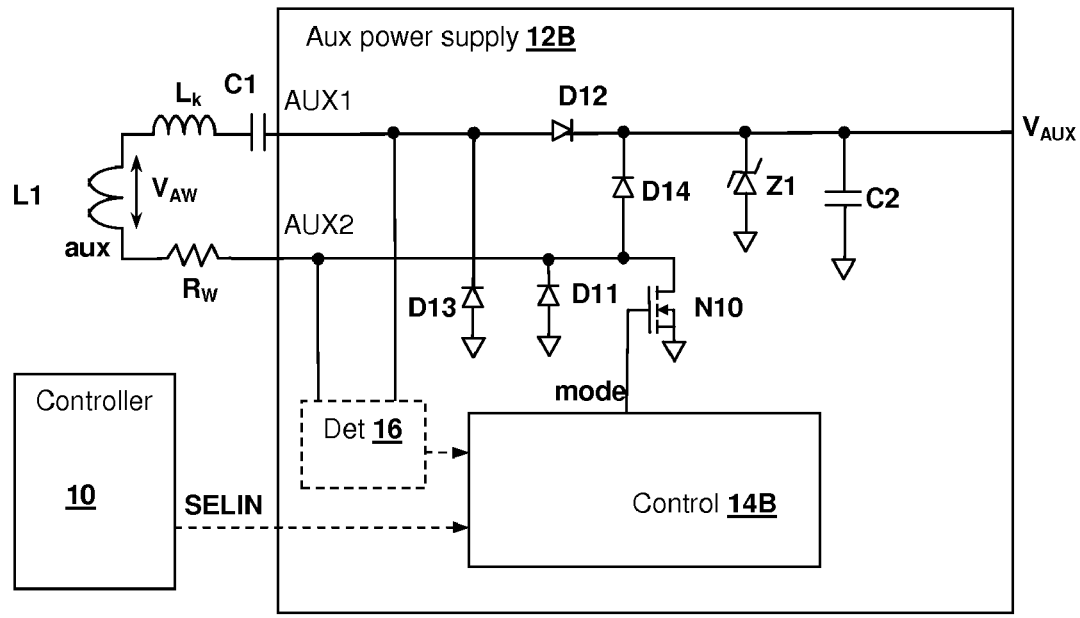
FIG. 2B is a schematic diagram depicting details of an auxiliary power supply 12B that can be used to implement auxiliary power supply 12 of FIG. 1 in accordance with another embodiment of the present invention.

Referring now to FIG. 2B, an auxiliary power supply circuit 12B that may be used to implement auxiliary power supply 12 of FIG. 1 is shown in accordance with another embodiment of the invention. Auxiliary power supply 12B is similar to auxiliary power supply 12A of FIG. 2A, and therefore only differences between them will be described. While the above-described output-feedback hysteretic regulator provides flexible control of the output voltage $V_{AUX}$ of auxiliary power supply 12A, there are other mechanisms by which it may be desirable to control output voltage $V_{AUX}$. Auxiliary power supply 12B illustrates two such mechanisms as options. In the first, the selectable operating mode of auxiliary power supply 12B is selected in conformity with the magnitude of voltage $V_{AW}$ available across auxiliary winding aux. A detector 16 may be provided to detect voltage $V_{AW}$ across auxiliary winding aux, and the value of $V_{AW}$ may be used to determine whether or not to select doubler mode at the output of control circuit 14B. In another embodiment of the invention, a signal from switching controller 10 provides an indication SELIN of a magnitude of input voltage $V_{IN}$, which can also be intelligently used to select doubler mode when input voltage $V_{IN}$ is low. Indication SELIN may be generated from a detection of the magnitude of input voltage $V_{IN}$, as made by switching controller 10 or from other information available to switching controller as to the type and magnitude of the power source supplied to the input of switching power converter 8.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A switched-power circuit, comprising:
a magnetic coupling element for coupling an input of the switched-power circuit to an output of the switched-power circuit and having a primary winding and at least one auxiliary winding;
a switching circuit for controlling charging of the magnetic coupling element from an input voltage source connected to the input of the switched-power circuit to the primary winding of the magnetic coupling element;
a control circuit coupled to the switching circuit for generating control signals for operating the switching circuit in response to a feedback signal provided from the output of the switched-power circuit; and
an auxiliary power supply having a selectable operating mode that is selected responsive to at least one control signal having at least two discrete states for selecting between at least two corresponding operating modes, wherein the auxiliary power supply has an auxiliary power supply input coupled to the auxiliary winding of the magnetic coupling element, wherein the auxiliary power supply generates an output voltage from the auxiliary winding in the at least two corresponding output modes such that a first non-zero ratio of the output voltage generated in a first one of the operating modes from the auxiliary winding to a voltage available from the auxiliary winding is greater than a second non-zero ratio of the output voltage generated in a second one of the operating modes from the auxiliary winding to the voltage available from the auxiliary winding.

2. The switched-power circuit of claim 1, wherein a state of the at least one control signal is selected in conformity with a magnitude of the output voltage, whereby the auxiliary power supply acts as a hysteretic voltage regulator.

3. The switched-power circuit of claim 1, wherein in the first operating mode, the output voltage is substantially equal to the sum of a magnitude of a negative peak voltage and a magnitude of a positive peak voltage available across the auxiliary winding less circuit voltage drops contributed by the auxiliary winding and the auxiliary power supply.

4. The switched-power circuit of claim 3, wherein in both the second operating mode of the auxiliary power supply and in the first operating mode, the auxiliary winding is capacitively coupled to the auxiliary power supply, whereby in the second operating mode, the output voltage is substantially equal to half of the peak-to-peak voltage available across the auxiliary winding less circuit voltage drops contributed by the auxiliary winding and the auxiliary power supply.

5. The switched-power circuit of claim 4, wherein in the second operating mode of the auxiliary power supply, an output of the capacitively coupled auxiliary winding is applied to a full-wave bridge rectifier that generates the output voltage.

6. The switched-power circuit of claim 5, wherein the auxiliary power supply comprises a transistor that is activated in the first operating mode of the auxiliary power supply, wherein the transistor shorts a connection from one of the terminals of the auxiliary winding to one of the outputs of the full-wave bridge rectifier, whereby the other output of the full wave bridge rectifier provides a voltage doubler output that generates the output voltage.

7. The switched-power circuit of claim 1, wherein an operating mode of the auxiliary power supply is selected in conformity with a measurement of a magnitude of the voltage available across the auxiliary winding.

8. The switched-power circuit of claim 1, wherein the operating mode of the auxiliary power supply is selected in conformity with an indication received from the control circuit, wherein the indication is an indication of an expected voltage provided by the input voltage source.

9. A method of operating a switched-power circuit, comprising:
switching an input voltage source across a primary winding of a magnetic coupling element to transfer power to an output of the switched-power circuit, wherein the magnetic coupling element has the primary winding and an auxiliary winding;
controlling a period of the switching in conformity with a feedback signal provided from the output of the switched-power circuit; and
selectively generating a voltage from the auxiliary winding of the magnetic coupling element for supplying power to a control circuit that performs the controlling using an auxiliary power supply having a selectable operating mode that is selected responsive to at least one control signal having at least two discrete states for selecting between at least two corresponding operating modes, wherein in a first one of the selectable operating modes, the selectively generating generates an output voltage from the auxiliary winding such that a first non-zero ratio of the output voltage generated from the auxiliary winding to a voltage available from the auxiliary winding is greater than a second non-zero ratio of the output voltage generated from the auxiliary winding to the voltage available from the auxiliary winding in a second one of the selectable operating modes.

10. The method of claim 9, further comprising selecting the state of the control signal in conformity with a magnitude of the output voltage, whereby the auxiliary power supply acts as a hysteretic voltage regulator.

11. The method of claim 9, wherein in the first operating mode the output voltage is substantially equal to the sum of a magnitude of a negative peak voltage and a magnitude of a positive peak voltage available across the auxiliary winding less circuit voltage drops.

12. The method of claim 11, wherein in the first operating mode and the second operating mode of the auxiliary power supply, the auxiliary winding is capacitively coupled to a auxiliary power supply, whereby in the second operating mode, the output voltage is substantially equal to half of the peak-to-peak voltage available across the auxiliary winding.

13. The method of claim 12, further comprising in the second selectable operating mode of the auxiliary power supply, applying the output of the capacitively coupled auxiliary winding to a full-wave bridge rectifier that generates the output voltage.

14. The method of claim 13, further comprising activating a transistor that shorts a connection from one of the terminals of the auxiliary winding to one of the outputs of the full-wave bridge rectifier in response to selection of the first selectable operating mode of the auxiliary power supply, whereby the other output of the full wave bridge rectifier becomes a doubler output that generates the output voltage.

15. The method of claim 9, further comprising measuring a magnitude of the voltage available across the auxiliary winding, and wherein the selectively generating selects an operating mode of the auxiliary power supply in conformity a result of the measuring.

16. The method of claim 9, further comprising receiving an indication of expected voltage magnitude at the input of the switched-power circuit from the control circuit, and wherein the selectively generating selects an operating mode of the auxiliary power supply in conformity with the received indication.

17. An integrated circuit, comprising:
 a switching control circuit for controlling a switch for charging an external magnetic coupling element through a primary winding in response to a feedback signal provided to the integrated circuit; and
 an auxiliary power supply having a selectable operating mode that is selected responsive to at least one control signal having at least two discrete states for selecting between at least two corresponding operating modes, wherein the auxiliary power supply has an input coupled to an auxiliary power supply input terminal for coupling the integrated circuit to an auxiliary winding of the external magnetic coupling element, wherein the auxiliary power supply generates an output voltage from the auxiliary winding in the at least two corresponding output modes such that a first non-zero ratio of the output voltage generated in a first one of the operating modes from the auxiliary winding to a voltage available from the auxiliary winding is greater than a second non-zero ratio of the output voltage generated in a second one of the operating modes from the auxiliary winding to the voltage available from the auxiliary winding.

18. The integrated circuit of claim 17, wherein a state of the at least one control signal is selected in conformity with a magnitude of the output voltage, whereby the auxiliary power supply acts as a hysteretic voltage regulator.

19. The integrated circuit of claim 17, wherein in the first operating mode the output voltage is substantially equal to the sum of a magnitude of a negative peak voltage and a magnitude of a positive peak voltage available across the auxiliary winding less circuit voltage drops contributed by the auxiliary winding and the auxiliary power supply.

20. The integrated circuit of claim 19, wherein in the second operating mode of the auxiliary power supply and in the first operating mode, the auxiliary winding is capacitively coupled to the auxiliary power supply, whereby in the second operating mode, the output voltage is substantially equal to half of the peak-to-peak voltage available across the auxiliary winding less circuit drops contributed by the auxiliary winding and the auxiliary power supply.

21. The integrated circuit of claim 20, wherein in the second operating mode of the auxiliary power supply, the output of the capacitively coupled auxiliary winding is applied to a full-wave bridge rectifier that generates the output voltage.

22. The integrated circuit of claim 21, wherein the auxiliary power supply comprises a transistor that is activated in the first operating mode of the auxiliary power supply, wherein the transistor shorts a connection from one of the terminals of the auxiliary winding to one of the outputs of the full-wave bridge rectifier, whereby the other output of the full wave bridge rectifier provides a voltage doubler output that generates the output voltage.

\* \* \* \* \*